United States Patent [19]
Greiner et al.

[11] Patent Number: 4,474,226
[45] Date of Patent: Oct. 2, 1984

[54] METHOD AND MEANS OF EXCHANGING HEAT BETWEEN FLUID BODIES

[75] Inventors: Thomas H. Greiner, Ames, Iowa; Michael E. Hein, Madison, Wis.

[73] Assignee: Iowa State University Research Foundation, Inc., Ames, Iowa

[21] Appl. No.: 305,388

[22] Filed: Sep. 25, 1981

[51] Int. Cl.³ .............................................. F28F 9/24
[52] U.S. Cl. .................................. 165/1; 165/109 R; 165/164; 165/170; 165/DIG. 11
[58] Field of Search .................. 165/DIG. 11, 109 R, 165/164, 170, 1

[56] References Cited

U.S. PATENT DOCUMENTS

| | | | |
|---|---|---|---|
| 880,360 | 2/1908 | Colling | 165/109 R |
| 1,828,477 | 10/1931 | Seligman | 165/164 |
| 2,312,451 | 3/1943 | Strike | 165/170 X |
| 3,771,589 | 11/1973 | Lage | 165/109 R X |
| 3,788,393 | 1/1974 | Plizak | 165/109 R |
| 4,122,828 | 10/1978 | DiPeri | 165/170 X |
| 4,318,781 | 3/1982 | Iida | 165/DIG. 11 |

FOREIGN PATENT DOCUMENTS

| | | | |
|---|---|---|---|
| 526493 | 6/1956 | Canada | 165/164 |
| 607506 | 8/1960 | Italy | 165/170 |

*Primary Examiner*—Sheldon J. Richter
*Attorney, Agent, or Firm*—Zarley, McKee, Thomte, Voorhees & Sease

[57] ABSTRACT

A method and means of exchanging heat in fluids is described herein. The heat exchanger device is comprised of a primary compartment which is separated into at least two longitudinal compartments by a vertically disposed heat exchanger plate. Each longitudinal compartment is divided into a plurality of sub-compartments by walls that extend outwardly from the heat exchanger plate to the sidewalls of the primary compartment. Fluid inlet means are provided at the lower portion and at opposite ends of each longitudinal compartment. Fluid outlet means are provided at the upper portion and at opposite ends of each longitudinal compartment. The sidewalls of each sub-compartment are shorter than the height of the heat exchanger plate to provide a common fluid flow way in each longitudinal compartment over the sub-compartments. The sidewalls of the sub-compartments are progressively lowered at their upper ends in the direction of fluid flow through the flow ways.

The method of this invention comprises introducing cold fluid into one of said longitudinal compartments wherein the cold fluid is moved generally in one direction past the heat exchanger plate as the fluid moves into the various sub-compartments and through the flow way to the fluid outlet means. Simultaneously, warmer fluid is introduced into the other of said longitudinal compartments and is similarly moving past the opposite side of the heat exchanger plate but in an opposite direction. Air is introduced into the bottom of the sub-compartments to agitate the fluid that is moving through the longitudinal compartments. Heat is transferred from the warm fluid in one longitudinal compartment to the cooler fluid in the other longitudinal compartment through the heat exchanger plate.

13 Claims, 5 Drawing Figures

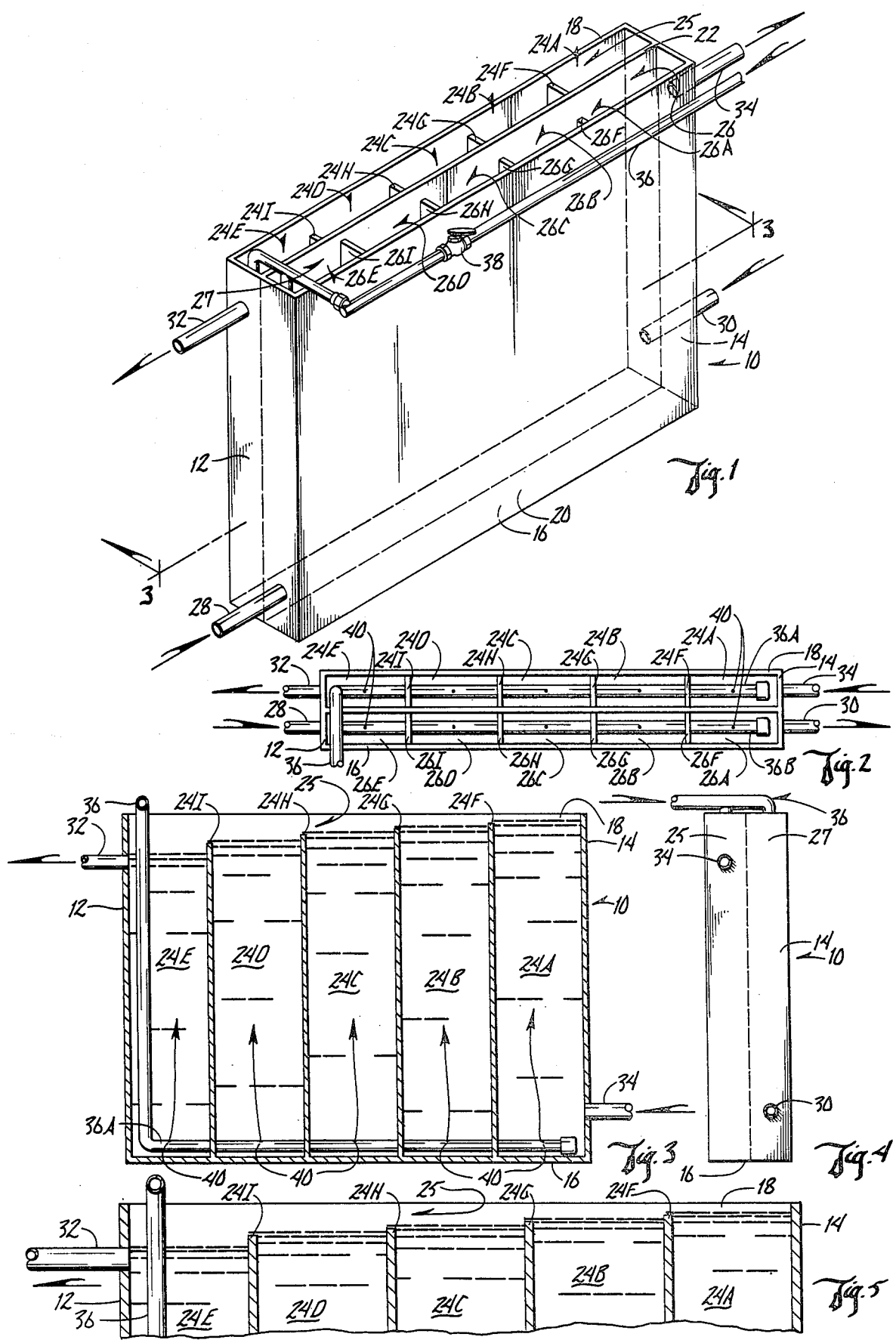

METHOD AND MEANS OF EXCHANGING HEAT BETWEEN FLUID BODIES

BACKGROUND OF THE INVENTION

There are many situations where it is desirable to exchange heat between warm bodies of fluid and cooler bodies of fluid. One of these situations arises in the use of digesters for animal manure wherein certain useful gases are generated in the digesters as heated fluid manure is processed therethrough.

Since animal liquid manure contains considerable solids, it is difficult to move such fluid through a heat exchanger without the exchanger often becoming clogged with the solids. This is particularly true when fluid is conveyed through such a heat exchanger at low velocities.

Various mechanical agitating means have been provided in such heat exchangers to minimize the clogging problem, but they have not met with success. Further, the heat exchangers of the prior art are often very difficult to clean, and the buildup of film or solids on heat exchanger plates detracts from the heat exchanging efficiency thereof. Prior art heat exchanging devices and the associated agitation equipment therein do not successfully interrupt the laminar flow of fluid adjacent the plates nor do they keep the body of fluid in intimate contact with the heat exchanger plates so that efficient exchange of heat can take place through the plate.

It is, therefore, an object of this invention to provide an efficient heat exchanger for fluids that will provide high efficiency in the transfer of heat from a warm body of fluid to a cooler body of fluid.

It is a further object of this invention to provide a method and means of transferring heat from a warmer body of fluid to a cooler body of fluid whereby the cooler body of fluid will have an ultimate temperature substantially equal to the temperature of the incoming warm body of fluid.

A further object of this invention is to provide a heat exchanger means for fluids that will be easy to clean.

A further object of this invention will be to provide a method and means of exchanging heat between separate bodies of fluid wherein the heat exchanger will not be clogged even when fluid flow is at a low velocity.

A further object of this invention is provide a method and means for exchanging heat between separate bodies of fluid whereby the fluid can be effectively agitated with low power requirements.

A still further object of this invention is to provide a method of exchanging heat between separate bodies of fluid whereby laminar flow of fluid adjacent heat exchanger plates will be substantially interrupted and both bodies of fluid will be maintained in intimate contact with the heat exchanger plates.

These and other objects will be apparent to those skilled in the art.

BRIEF SUMMARY OF THE INVENTION

The heat exchanger of this invention is comprised of a primary compartment that is divided into at least two longitudinal compartments by a longitudinally extending heat exchanger plate. Each longitudinal compartment is divided into a plurality of sub-compartments, by a plurality of plates that extend outwardly from the heat exchanger plate to the sidewalls of the primary compartment. The sidewalls of the sub-compartment are shorter than the heat exchanger plate to provide a common fluid flow way in each longitudinal compartment above the sub-compartments. The sidewalls of the sub-compartments are progressively lowered in a direction of fluid flow through the respective flow ways. Inlet means are provided at opposite ends of the longitudinal compartments at the lower portions thereof, and outlet means are provided in each longitudinal compartment at opposite ends from the inlet means at the upper portions of the longitudinal compartments. An air pipe with a plurality of holes therein extends through the bottom of the sub-compartments to permit air to be introduced into the sub-compartments whereby fluid therein will be agitated.

The method of this invention comprises introducing a quantity of cool fluid into one of said longitudinal compartments, and introducing a body of warmer fluid into the other of said longitudinal compartments whereby the flow of warm and cool fluid will be in opposite directions with respect to the heat exchanger plate. Air is introduced into these sub-compartments to provide complete agitation of the fluid on opposite sides of the heat exchanger plate.

BRIEF DESCRIPTION OF THE DRAWINGS

FIG. 1 is a perspective view of the heat exchanger device of this invention;

FIG. 2 is a top plan view thereof;

FIG. 3 is a longitudinal, sectional view taken on line 3—3 of FIG. 1;

FIG. 4 is an end elevational view as seen from the righthand end of FIG. 3; and

FIG. 5 is an enlarged scale view of the upper portion of FIG. 3.

DESCRIPTION OF THE PREFERRED EMBODIMENT

The primary container 10 is comprised of end wall 12, end wall 14, bottom 16, and opposite sidewalls 18 and 20. The top portion of container 10 is preferably open to the atmosphere. Insultation (not shown) normally would be placed around the outside walls of the primary container 10.

A metal heat exchanger plate 22 is located on the longitudinal center line of primary container 10 and completely divides the container 10 into two longitudinal compartments 24 and 26. The primary container 10 could be divided into more longitudinal compartments, but the two compartments 24 and 26 readily illustrate the principal of the invention as will be seen hereafter.

The longitudinal compartment 24 is divided into sub-compartments 24A, 24B, 24C, 24D, and 24E by a plurality of walls 24F, 24G, 24H and 24I, respectively. These walls 24F through 24I extend at right angles to heat exchanger plate 22 and span the difference from the heat exchanger plate to the sidewall 18 of container 10. All of the walls 24F through 24I are shorter than the heat exchanger plate 22 to provide a generally horizontal flow way 25 at the upper portion of longitudinal compartment 24. Also, as seen in FIG. 1, the walls 24F through 24I are each progressively shorter.

In the same manner, longitudinal compartment 26 is divided into sub-compartments 26A, 26B, 26C, 26D and 26E by walls 26F, 26G, 26H and 26I, respectively. The sub-compartments and the sidewalls thereof of longitudinal compartment 26 are identical to those of longitudinal compartment 24 except that the height of the walls 26F–26I decrease in an opposite direction with respect to the walls 24F–24I. A flow way 27 is thus created in the upper portion of longitudinal compartment 26 and is expected to convey fluid in an opposite direction from the flow way 25 in longitudinal compartment 24.

A fluid inlet port 28 is located in end wall 12 of container 10 and is in communication with the lower portion of longitudinal compartment 26. Similarly, a fluid inlet port 30 is located in end wall 14 of container 10 at the lower portion of longitudinal compartment 24.

Fluid outlet port 32 is located in end wall 14 of primary container 10 at the upper portion of longitudinal compartment 26. Fluid outlet port 34 is located in end wall 12 of container 10 at the upper portion of longitudinal compartment 24.

An air pipe means 36 extends into the primary container 10 where it divides into pipe segments 36A and 36B which extend through the longitudinal compartments 24 and 26, respectively. A valve 38 is imposed in air pipe means 36 to control the flow of air therethrough. The air pipe means 36 is closed except for holes 40. One hole 40 is located in each of the above-described sub-compartments. The hole 40 is approximately 0.089 inches in diameter.

The device of this invention is adapted for flow rates of relatively slow velocities. For example, the device of this invention will tolerate a minimum flow rate of $14 \times 10^{-3}$ kg/s.

Typically, inlet port 28 of longitudinal compartment 26 would be connected to relatively cool fluid (i.e., 50° F.) which might exist in a conventional manure lagoon. Inlet port 30 of longitudinal compartment 24 would be connected to a conventional digester which would be discharging fluid which conventionally would be approximately 90° F. The increased temperature of the fluid leaving the digester would be achieved through the internal processes of the digester as well as supplemental heat provided thereto. The purpose of this invention is to raise the temperature of the incoming cool fluid to approximately the temperature of the fluid leaving the digester.

It should be borne in mind that the efficiency of any heat exchanger for fluids is inhibited by a film of material that tends to build up on heat exchanger plates. By introducing air into the various sub-compartments, the fluid sewage is sufficiently agitated and the buildup of film on the heat exchanger plate 22 is kept at a minimum.

Also, laminar flow of fluid which can be characterized as a thin layer of fluid at the surface of the plate, tends to insulate a body of fluid from a heat exchanger plate. The airagitation means of this invention serves to break up any such laminar flow, and further tends to cause the total body of fluid to be in more intimate contact with the heat exchanger plate.

The cold fluid enters the bottom of sub-compartment 26E and then flows over the top of wall 26I into sub-compartment 26D. This process is continued until all the sub-compartments are filled and fluid then moves towards the digester through fluid outlet port 34. Similarly, warm fluid enters the bottom of subcompartment 24A and then flows over the top of wall 24F to fill compartment 24B. This process is completed until longitudinal compartment 24 is completely filled and begins exiting compartment 24 through outlet port 32. The temperature of fluid in longitudinal compartment 26 gradually increases from compartment 26E to compartment 26A. Conversely, fluid in longitudinal compartment 24 gradually decreases from sub-compartment 24A to sub-compartment 24E. In a conventional fluid heat exchanger, where the entering cool fluid was approximately at 50° F. and the entering heated fluid was approximately at 90° F., the cool fluid would be raised to an average level of approximately 70° F. In the method and device of this invention, the cool fluid leaving sub-compartment 26A through outlet port 34 is very close, or equal, to the 90° temperature of the fluid entering sub-compartment 24A.

The graduated heights of the sidewalls of the sub-compartments prevents any reverse mixture of fluid so that the temperature gradient of the fluid in the longitudinal compartments progressively varies in the direction of fluid flow therein. Thus, for example, (see FIG. 3), the relatively cool fluid in sub-compartment 24E cannot rise above the top of wall 24I to mix with the fluid in sub-compartment 24D.

As indicated heretofore, the heated fluid leaving longitudinal compartment 26 moves though port 34 to the digester or other apparatus to which the heat exchanger is connected. The discharge conduit 32 is connected to a lagoon or other disposal means to handle the fluid which has been already processed through the digester.

From the foregoing, it is seen that the method and device of this invention achieve at least their stated objectives.

We claim:

1. The method of exchanging heat between fluid bodies, comprising,
    passing a first quantity of heated fluid into one end of a first elongated compartment having a heat exchanger plate adjacent one side thereof,
    dividing said first longitudinal compartment into a plurality of vertically disposed sub-compartments having closed bottoms and with a common fluid flow way extending only over each of said sub-compartments,
    passing a second quantity of cold fluid into one end of a second longitudinal compartment having said heat exchanger plate adjacent one side thereof,
    dividing said second longitudinal compartment into a plurality of vertically disposed sub-compartments with a common fluid flow way extending over each of said sub-compartments,
    allowing said heated and cold quantities of fluid to pass into said sub-compartments and through the flow ways of said first and second longitudinal compartments respectively whereby said cold fluid will acquire heat from said heated fluid through said heat exchanger plate,
    and introducing air into the bottom of each of said sub-compartments to agitate the fluid therein.

2. The method of claim 1 wherein said heated fluid and said cold fluid move through said longitudinal compartments in opposite directions.

3. The method of claim 2 wherein said heated fluid and said cold fluid enter said first and second longitudinal compartments, respectively, at opposite ends thereof.

4. The method of claim 2 wherein said heated fluid and said cold fluid enter said first and second longitudinal compartments, respectively, at opposite lower ends thereof, and exit at opposite upper ends thereof.

5. The method of claim 1 wherein the flow of fluid through said flow way is subjected to a waterfall effect by progressively lower sidewalls of said sub-compartments which become progressively lower in the direction of fluid flow through said flow ways.

6. The method of exchanging heat between fluid bodies, comprising, passing a first quantity of heated fluid into one end of a first elongated compartment having a heat exchanger plate adjacent one side thereof, dividing said first longitudinal compartment into a plurality of vertically disposed sub-compartments with a common fluid flow way extending over each of said sub-compartments, passing a second quantity of cold fluid into one end of a second longitudinal compartment having said heat exchanger plate adjacent one side thereof, dividing said second longitudinal compartment into a pluraliy of vertically disposed sub-compartments with a common fluid flow way extending over each of said sub-compartments, moving fluid from one sub-compartment to another through a flow way at the upper ends of the sub-compartments of each longitudinal compartment, allowing said heated and cold quantities of fluid to pass into said sub-compartments and through the flow ways of said first and second longitudinal compartments respectively whereby said cold fluid will acquire heat from said heated fluid through said heat exchanger plate, and introducing air into the bottom of each of said sub-compartments to agitate the fluid therein.

7. A heat exchanger for fluids, comprising, a primary compartment having opposite ends and at least two separate longitudinal compartments, with each of said longitudinal compartments being divided into a plurality of separate sub-compartments having closed bottoms, fluid inlet means in each longitudinal compartment and at opposite ends thereof, a heat exchanger plate separating said longitudinal compartments, a single common flow way in each of said longitudinal compartments in communication with and positioned over said sub-compartments, fluid outlet means in each of said longitudinal compartments, said fluid inlet means being located in the bottom portions of said longitudinal compartments, and said fluid outlet means are located in the upper portions of said longitudinal compartments and at opposite ends thereof, and means for introducing air into said sub-compartments to agaitate fluid therein.

8. A heat exchanger for fluids, comprising, a primary compartment having opposite ends and at least two separate longitudinal compartments, with each of said longitudinal compartments being divided into a plurality of separate sub-compartments having closed bottoms, fluid inlet means in each longitudinal compartment and at opposite ends thereof, a heat exchanger plate separating said longitudinal compartments, a single common flow way in each of said longitudinal compartments in communication with and positioned over said sub-compartments, fluid outlet means in each of said longitudinal compartments, and means for introducing air into said sub-compartments to agaitate fluid therein.

9. The device of claim 8 wherein said means for introducing air into said sub-compartments are located at the bottom portions of said sub-compartments.

10. The device of claim 8 wherein said sub-compartments have sidewalls that are progressively lowered in height in said flow ways in a direction of fluid flow in said flow way.

11. The device of claim 8 wherein all of said compartments and sub-compartments are open to the atmosphere.

12. The device of claim 8 wherein the top of said primary compartment is completely open to permit cleaning access to said heat exchanger plate.

13. The device of claim 8 wherein said means for extending air into said sub-compartments is a perforated pipe.

* * * * *